United States Patent [19]

Kurotaki, Kiyomitu

[11] 4,335,705
[45] Jun. 22, 1982

[54] SMOKE COLLECTING AND EXHAUSTING SYSTEM FOR A ROASTER

[76] Inventor: Kurotaki, Kiyomitu, No. 20-8, 1-chome, Jinnan, Shibuya-ku, Tokyo, Japan

[21] Appl. No.: 165,004

[22] Filed: Jul. 1, 1980

[51] Int. Cl.³ .............................................. F24C 15/20
[52] U.S. Cl. .............................. 126/299 R; 98/115 R; 126/41 R
[58] Field of Search ........... 126/299 R, 299 D, 299 F, 126/41 R; 98/115 R, 115 VM

[56] References Cited

U.S. PATENT DOCUMENTS

| 928,158 | 7/1909 | Smethurst | 98/115 VM |
| 3,008,406 | 11/1961 | Reeves et al. | 99/446 |
| 3,376,583 | 4/1968 | Frey | 98/115 R X |
| 3,766,906 | 10/1973 | Jenn | 126/299 R |
| 4,084,947 | 4/1978 | Ear | 126/299 D X |

FOREIGN PATENT DOCUMENTS 660716  11/1951  United Kingdom ............. 98/115 R

Primary Examiner—William E. Wayner
Assistant Examiner—Harold Joyce
Attorney, Agent, or Firm—Wenderoth, Lind & Ponack

[57] ABSTRACT

This invention pertains to a smoke collecting and exhausting system for a roaster boiler. The roaster includes a smoke exhaust passage provided therein so as to direct smoke from the roaster downwardly and to a smoke collecting and exhausting system. The smoke collecting and exhausting system includes a smoke collecting duct means which communicates with the smoke exhaust passage for collecting smoke from the roaster. The smoke collecting and exhausting system also has filter provided in the smoke collecting duct for removing oil particles from the smoke. A smoke drawing device is provided at a location away from the roaster and is connected to the smoke collecting duct downstream of the roaster.

6 Claims, 7 Drawing Figures

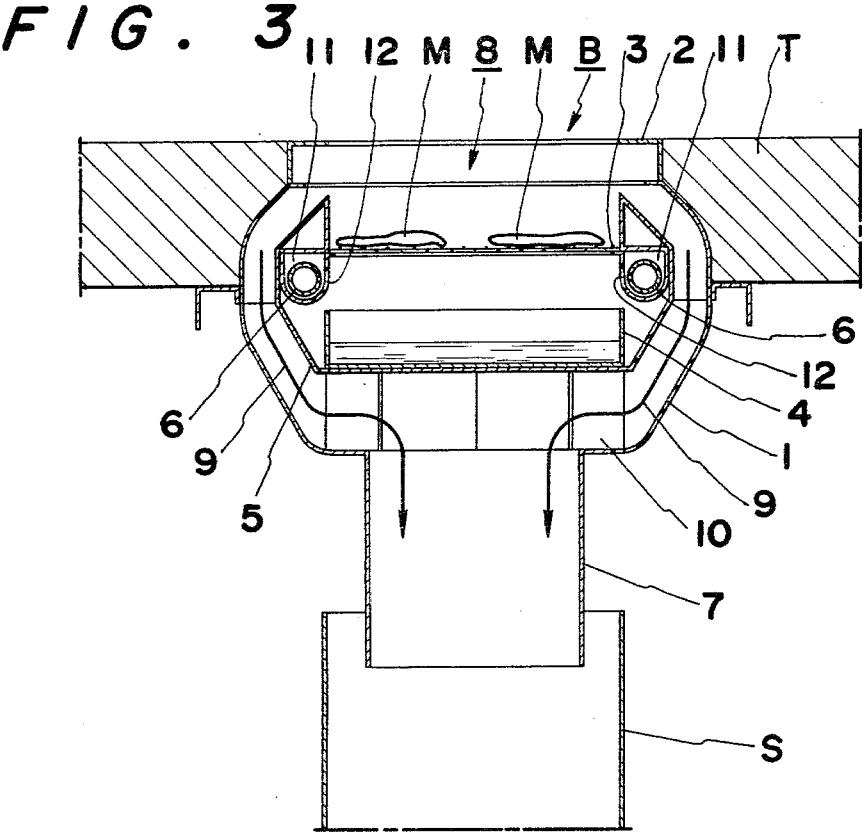
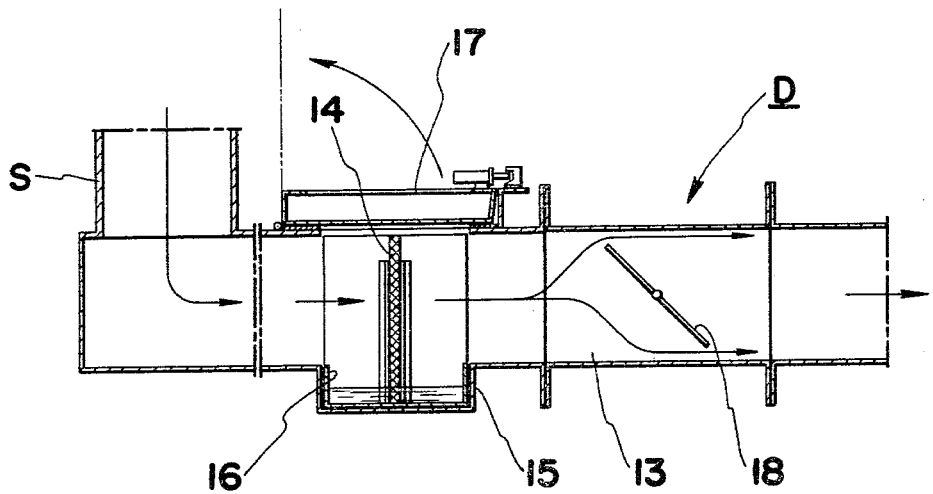

SMOKE COLLECTING AND EXHAUSTING SYSTEM FOR A ROASTER

BACKGROUND OF THE INVENTION

A roaster which roasts articles such as meat and sea food on an iron plate or a net-like plate has been used in a restaurant or a household. In the prior art, smoke produced from meat or sea food when it is roasted has been exhausted by a smoke suction means provided on a ceiling or the wall of a room where the roaster is installed. However, in the prior art, the smoke permeates the room because there is a substantial distance between the roaster and the smoke suction means. Thus, the smoke could not be effectively exhausted from the room and oil particles contained in the smoke tended to stick to wears or to interior installations such as the ceiling, curtains, etc. causing damage to them. Also, there have been sanitary problems caused by the smoke. If the smoke exhaust or suction means is close to the roaster, the effectiveness of the means for exhausting the smoke will be improved, however, with such an arrangement it is difficult to cook the articles in an effective manner. Conversely, exhausting methods of the prior art cause smoke to permeate the restaurant thereby making the customers dissatisfied as well as damaging the interior of the restaurant.

SUMMARY OF THE INVENTION

Accordingly, it is a principal object of the invention to provide a smoke collecting and exhausting system for a roaster wherein smoke from the roaster never permeates the ambient atmosphere and oil particles can be effectively removed from the smoke.

It is another object of the invention to provide a smoke collecting and exhausting system for a roaster wherein a filter for removing oil particles can be easily replaced when it is damaged.

It is another object of the invention to provide a roaster in combination with a smoke collecting and exhausting system wherein smoke can be effectively introduced into the smoke collecting and exhausting system.

It is another object of the invention to provide a roaster in combination with a smoke collecting and exhausting system in which the aerodynamic flow of the smoke stream therethrough can be increased.

It is further object of the invention to provide a roaster in combination with a smoke collecting and exhausting system wherein heat from a burner is not reduced due to the function and operation of a smoke collecting and exhausting system.

In accordance with the invention, there is provided a smoke collecting system for a roaster comprising a smoke collecting duct means provided underneath and communicating with a smoke exhaust passage in the roaster so as to collect smoke therefrom; filter means provided in said smoke collecting duct means to remove oil particles from the smoke; and a smoke suction means provided downstream of the collecting duct means for exhausting smoke from the collecting duct means.

BRIEF DESCRIPTION OF THE DRAWINGS

The above and other objects and features of the invention will be apparent from the description of the preferred embodiment taken with reference to the accompanying drawings in which;

FIG. 3 is an enlarged cross sectional view of the roaster constructed in accordance with the invention;

FIG. 4 is an enlarged cross sectional view of a smoke collecting duct;

DETAILED DESCRIPTION OF THE EMBODIMENT

Figure 1:
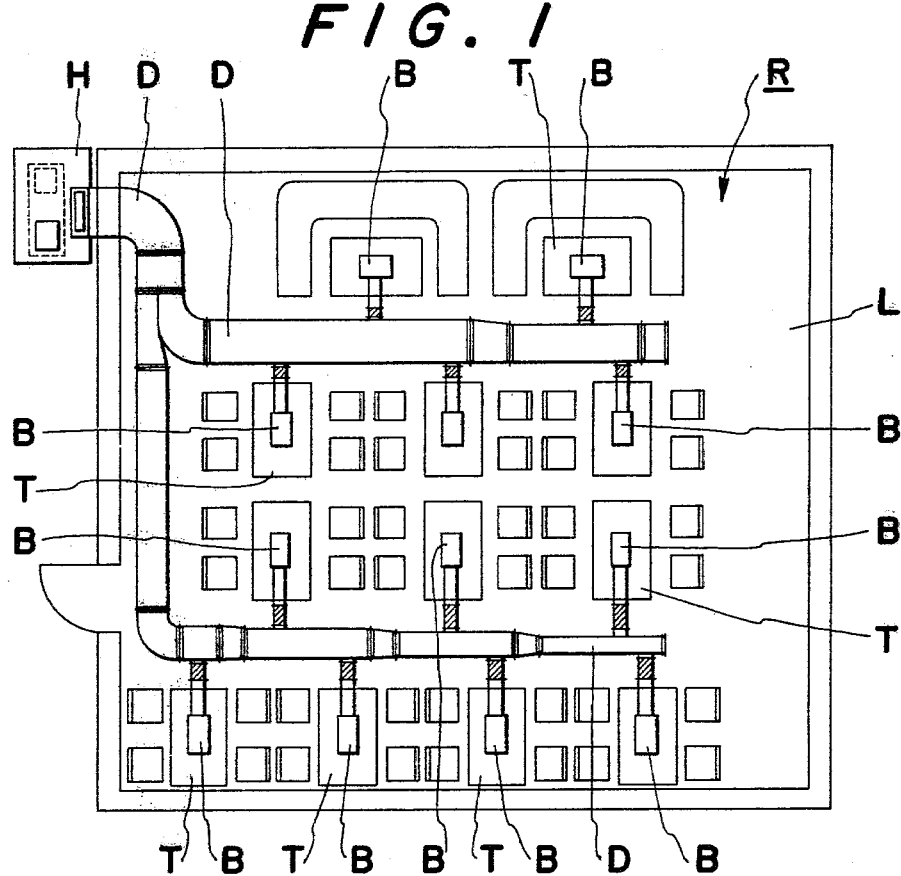
FIG. 1 illustrates a smoke collecting and exhaust system constructed in accordance with the invention.
Figure 2:
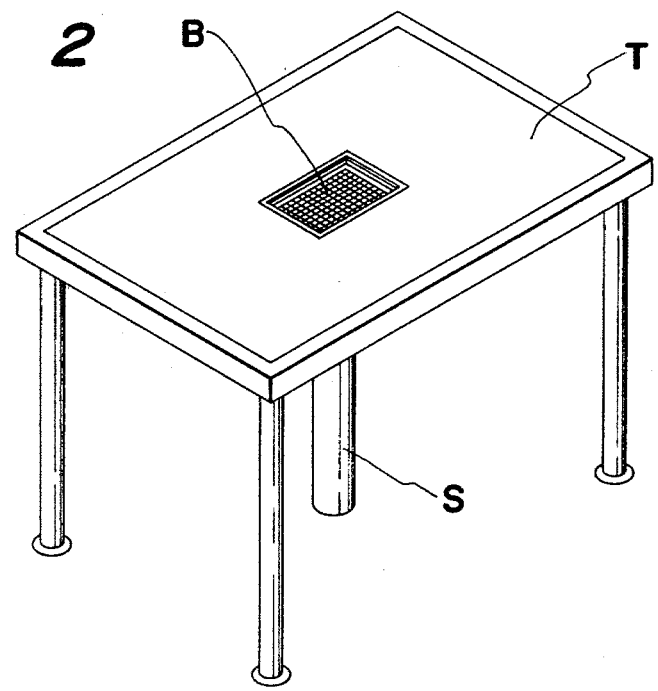
FIG. 2 is a perspective view of a table having a roaster provided thereon.
Figure 5:
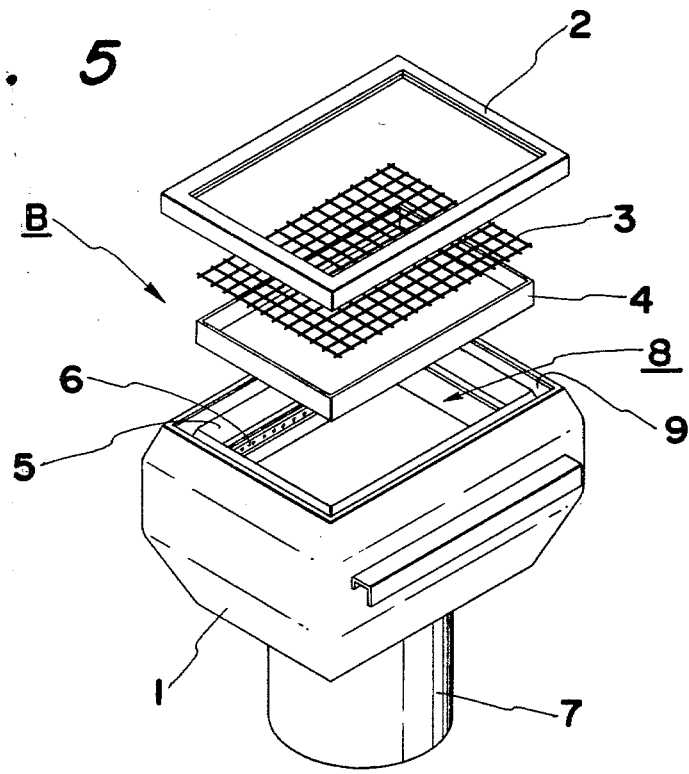
FIG. 5 is an enlarged and perspective view of the roaster shown in FIG. 3.

FIG. 1 shows a room in a restaurant R where a plurality of tables T are disposed. The tables are constructed to be heat resistant by a manner conventionally known. Roasters or boilers are mounted on the respective tables T and communicate with respective smoke exhaust duct cylindrical members S which in turn communicate with two smoke collecting ducts D provided under the floor or ground L. The smoke collecting ducts D respectively terminate at conventional smoke suction means H provided outdoors. As shown in the Figures, the roasters B comprise a rectangular roaster body 1 mounted on the respective tables T, an upper cover 2 mounted on the roaster body 1, a net-like plate 3, a juice receiver 4 removably provided in the roaster body 1, an inner body 5 secured to the roaster body 1, and burners 6 provided in the inner body 5.

The roaster body 1 may have a cylindrical body 7 extending from the bottom of the roaster body 1 and communicating with the smoke exhaust duct cylindrical member S and a space 8 may be provided at the top of the roaster body 1. A smoke exhaust passage 9 is provided between the inner wall of the roaster body 1 and the outer wall of the inner body 5 and communicates with fin or baffle means 10 which is provided at the bottom of the roaster body 1 for dividing the moving or flowing smoke.

The burners 6 may be disposed in two burner chambers 11 provided on both sides of the inner body 5, and the burners 6 have respective openings or apertures 12 for directing the flames from the burners 6 to the net-like plate 3. A gap 11 is provided in the burner chambers for passing air therethrough to be used in the burners.

A filter means 14 is provided in the smoke exhaust passage 13 in each of the smoke collecting ducts D for removing oil and dust from the smoke as shown in FIG. 4. The filter means 14 may be preferably held by a holder 16 which may be removably inserted into a recess 15 in the smoke exhaust passage 13. Thus, it will be noted that the filter means 16 can be removed from the smoke exhaust passage 13 by opening an upper cover 17 pivotally mounted to the smoke collecting duct D. A fire-proof damper 18 may be provided in the smoke exhaust passage 13.

As the gas burner 6 is ignited, articles M such as meat and sea food can be roasted. During the roasting process, oil particles and juices produced from the articles are deposited into the water of the juice receiver 4 while smoke is produced by burning the oil in the articles. Air necessary for combustion can be supplied from the outside of the roaster body 1 through the gaps in the burner chambers 11.

Since the interior of smoke exhaust passage 9, the smoke exhaust duct cylindrical member S and the smoke collecting ducts D are exhausted by the suction of the smoke suction means H, the smoke produced by the burner 6 never permeates the room R but is rather exhausted through the smoke exhaust passage 9, the smoke exhaust duct cylindrical member S and the smoke collecting duct D out of the room R while being filtered by the filter 14. As described later, the fin or baffle means 10 serves to equalize an unbalanced suction force which would occur in the case where the area of the bottom of the roaster body 1 is not identical to the inner diameter of the smoke exhaust cylindrical member and the fin means 10 thereby improves the smoke exhausting ability of the smoke collector.

Thus, it will be noted that since the smoke produced during the roasting process is exhausted from the roaster body 1 through the smoke collecting ducts under the floor or the ground by the negative pressure created by the smoke suction means H, the smoke is never fills in the room R. As a result, the ceiling and the walls of the room R are never damaged by the smoke. It will be understood that the air in the room R is also not polluted by the smoke from the roaster. It has been found that the smoke exhausting ability of the system of the invention can be improved substantially of the prior art in which the smoke exhaust system is provided at the ceiling of the room. It should be noted that by utilizing the present invention the roasting operation can also be performed by the customers in a simple and effective manner.

Since the smoke is filtered by the filter 14, smoke never damages the smoke suction means H. In addition thereto, since the filter 14 can be easily removed from the ducts D, it can be cleaned in a simple manner.

Figure 6:
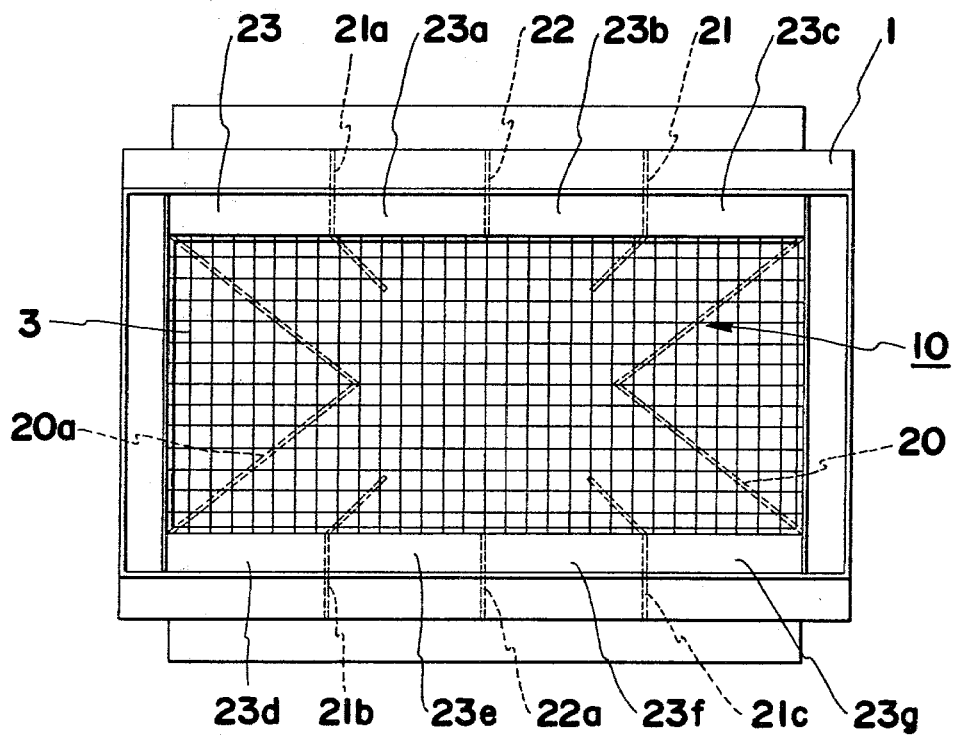
FIG. 6 is an enlarged elevated plan view of the roaster having baffle means.
Figure 7:
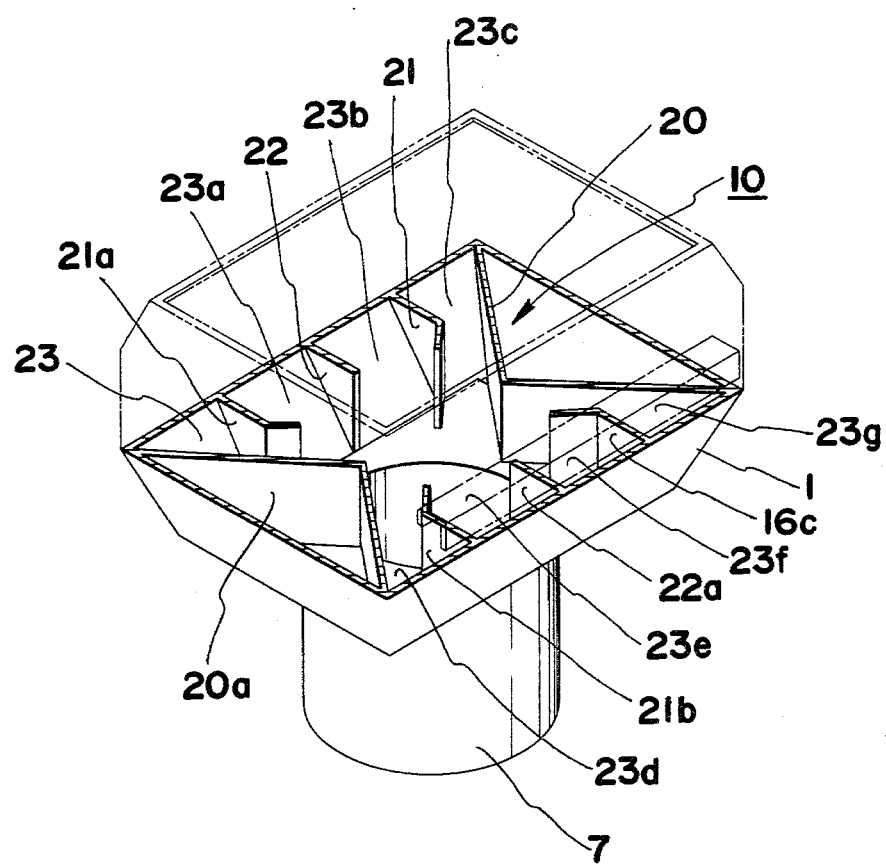
FIG. 7 is a perspective view of the fin means of the roaster according to the invention.

The fin or baffle means 10 which is shown in FIGS. 6 and 7 may comprise first wings 20 and 20a having edges facing the smoke exhaust cylindrical member 7, second wings 21, 21a, 21b and 21c having hook-shaped edges and adjacent to the first wings 20 and 20a and third wings 22 and 22a circumferentially disposed between the second wings 21 and 21a and between the second wings 21b and 21c, respectively, and projected radially inwardly from the body 1. As noted from FIG. 7, spaces 23, 23a, 23b, 23c, 23d, 23e, 23f and 23g formed between the respective wings communicate with the top opening of the smoke exhaust cylindrical member 7.

Referring to the function of the fin means 10, as the smoke flows from the smoke exhaust passage 9 through the fin means 10, it is substantially uniformly divided by the baffle 10 and flows through the spaces 23 to 23g into the smoke exhaust cylindrical member S. Thus, it will be noted that the unbalanced smoke exhaust flow which would occur in the area of the smoke exhaust passage 9 because the cross-sectional area of the passage 9 is not identical to that of the opening of the smoke exhaust cylindrical member 7, is made substantially uniform by the fins 10 as previously described. The balanced or uniform flow prevents the smoke from filling the room R. As a result, the smoke can be exhausted out of the room in a smooth and effective manner.

As shown in FIG. 3, the smoke exhaust passage 9 may be preferably curved, which causes the smoke to flow in a smooth manner as indicated by the arrows in FIG. 3, because of the aerodynamic structure of the passage a. The smooth flow prevents the oil contained in the smoke from sticking the surface of the roaster body 1. It should be noted that the net-like plate 3 lies in a plane above that of the burners 6 so that articles placed thereon are not directly exposed to heat from the burners 6. Further so as to provide a more suitable temperature for cooking articles on the plate 3, the inner body 5 has a raised wall portion which surrounds the periphery of the plate 3 for maintaining heater air around the top of the plate 3 even though the exhaust system draws air downwardly and away from the plate 3. The raised wall portion of the body 5 also functions to maintain the cooking articles at a constant temperature without the ambient temperature substantially effecting the cooking process.

Although a preferred embodiment of the invention has been illustrated and described with reference to the accompanying drawings, it will be understood to those skilled in the art that the preferred embodiment is by way of example and that various changes and modification may be made without departing from the spirit and scope of the invention, which is intended to be defined by the appended claims.

What is claimed is:

1. A roaster for cooking articles comprising:
   a roaster having a roaster body and a substantially rectangular burner means positioned within said roaster body for cooking articles;
   a smoke collection and exhaust system having a passage means positioned within the roaster body for collecting smoke from said roaster and a cylindrical exhaust duct means for exhausting smoke from said passage means;
   said passage means including two elongated passageways extending along opposite sides of said burner means and extending inwardly underneath said burner means and communicating with one another beneath said burner means;
   said exhaust duct means being centrally located underneath said roaster;
   a smoke exhausting means for creating a negative pressure in and exhausting smoke from said passage means through said exhaust duct means; and
   said passage means having baffle means positioned therein for dividing said passageways into substantially equal cross-sections, and said baffle means having ends terminating beneath said burner means and defining a substantially cylindrical space communicating with said exhaust duct means for substantially equalizing the negative pressure along a lateral cross-section of said exhaust duct means adjacent said passage means.

2. A roaster for cooking articles as claimed in claim 1, further comprising:
   said exhaust duct means having an opening in a sidewall thereof and a cover pivotally connected to said exhaust duct means for pivoting to an open and closed position for respectively uncovering and covering said opening; and
   a filter removably positioned within said exhaust duct means and being removable through said opening when said cover is pivoted to said open position.

3. A roaster for cooking articles as claimed in claim 1, further comprising:
   said burner means having two burners positioned along opposite sides thereof and two burner chambers, each respectively housing one of said burners;
   said burner means including a substantially horizontal plate positioned above and laterally displaced from said burners for placing articles thereon to be cooked; and each of said chambers having an aperture therein for directing flames from each of said burners toward the underneath of said plate and a gap therein for respectively providing air to said burners.

4. A roaster for cooking articles as claimed in claim 1, further comprising:
said roaster having an inner wall, said inner wall being spaced inwardly from said roaster body and being an outer peripheral surface of said burner means;
said burner means having at least one burner and a plate positioned above said burner for placing articles thereon to be cooked; and
said inner wall surrounding said plate and rising above the top surface of said plate.

5. A roaster for cooking articles as claimed in claim 1, further comprising:
said roaster having an inner wall, said inner wall being spaced inwardly from said roaster body and being an outer peripheral surface of said burner means; and
said elongated passageways extending between said roaster body and said inner wall.

6. A roaster for cooking articles as claimed in claim 1, wherein at least one segment of said passage means is curved.

* * * * *